July 26, 1938.  G. A. LYON  2,124,790
ORNAMENTAL FENDER SKIRT
Filed Oct. 7, 1936  2 Sheets-Sheet 1
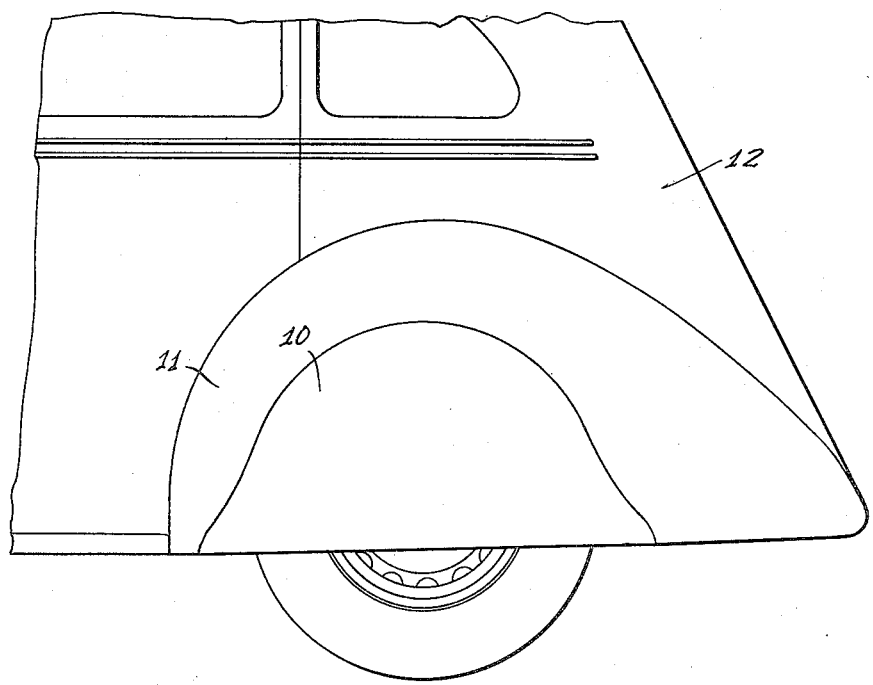
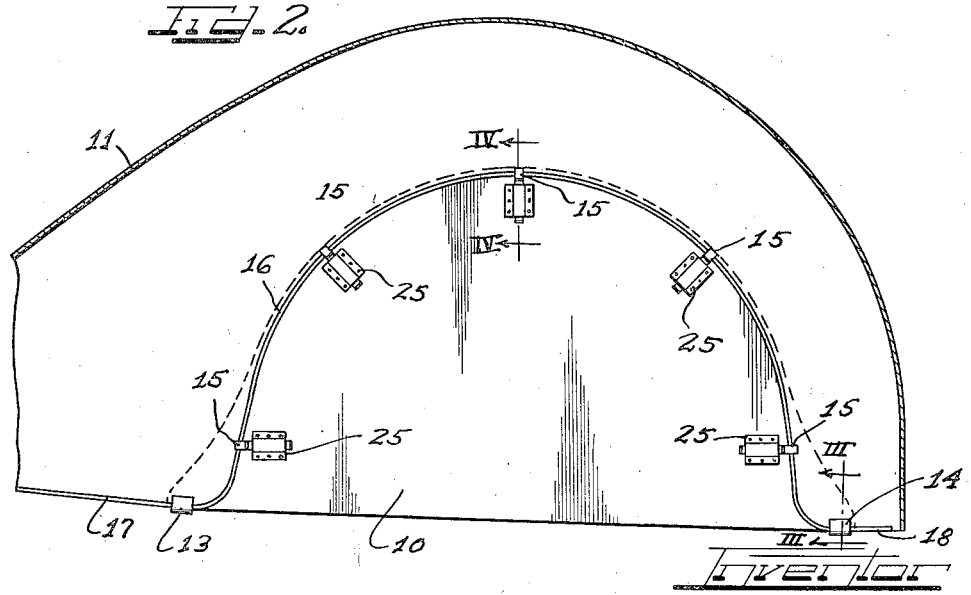
George Albert Lyon.

July 26, 1938.  G. A. LYON  2,124,790
ORNAMENTAL FENDER SKIRT
Filed Oct. 7, 1936  2 Sheets-Sheet 2
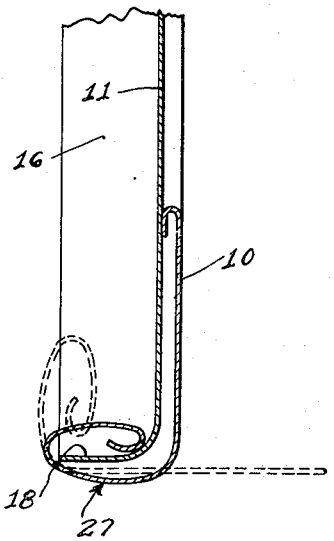
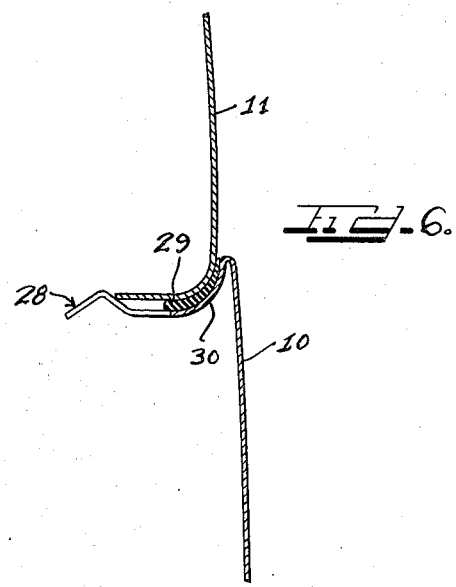
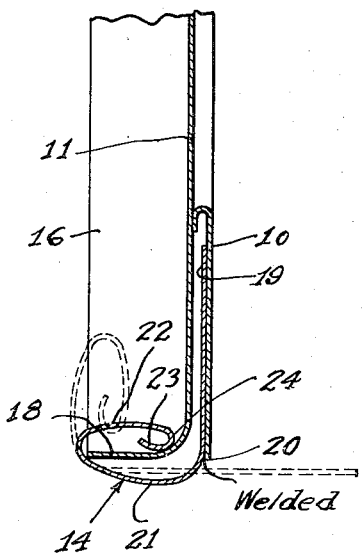
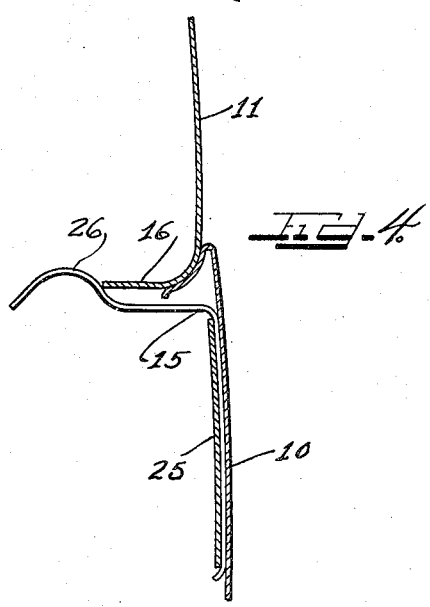
Inventor
GEORGE ALBERT LYON.

Patented July 26, 1938

2,124,790

UNITED STATES PATENT OFFICE 2,124,790

ORNAMENTAL FENDER SKIRT

George Albert Lyon, Allenhurst, N. J., assignor to Lyon Incorporated, Detroit, Mich., a corporation of Delaware Application October 7, 1936, Serial No. 104,375

8 Claims. (Cl. 280—153)

This invention relates to ornamental fender skirts, and more particularly to a novel means for securing an ornamental fender skirt to a vehicle fender.

In designing ornamental fender skirts or shields of the type which are adapted to cover the usual wheel access opening in a vehicle fender, it is important that the means which is employed to secure the fender skirt in desired position be simple and quick to operate both in assembling the fender skirt on the vehicle fender and removing it therefrom. It must also possess the desired degree of ruggedness when in use and be substantially free from vibration and noise.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel ornamental fender skirt having novel means thereon for supporting the ornamental fender skirt in desired position on a vehicle fender.

Another object of this invention is to provide a novel ornamental fender skirt having substantially spirally bent supporting members which are adapted to interengage a rearwardly extending base edge of a vehicle fender, thereby to permit the fender skirt to be rotated into desired position and to support the fender skirt in such position thereafter.

Another and further object of this invention is to provide a novel combination of vehicle fender and ornamental fender skirt.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile showing a vehicle fender and one embodiment of my ornamental fender skirt mounted thereon;

Figure 2 is a side elevational view, partly in cross section, of a vehicle fender and an ornamental fender skirt of the type illustrated in Figure 1, as viewed from the interior of the automobile looking outwardly;

Figure 3 is an enlarged fragmentary view in cross section illustrating the novel form of the supporting means which is employed on the ornamental fender skirt illustrated in Figures 1 and 2 of the drawings;

Figure 4 is an enlarged fragmentary view of the upper part of the ornamental fender skirt of Figures 1 and 2 and illustrates in detail the means employed to prevent rotational movement of the ornamental fender skirt about its supporting means;

Figure 5 is an enlarged fragmentary view similar to Figure 3 illustrating a supporting means similar to that illustrated in Figure 3 but which is formed integral with the fender skirt; and Figure 6 is an enlarged fragmentary view similar to Figure 4 illustrating a modified form of ornamental skirt retaining means, the means in this modification being formed integral with the fender skirt.

In the embodiment of this invention illustrated in Figures 1 to 4 of the drawings, a novel means is shown for supporting and mounting an ornamental fender skirt 10 on a rear fender 11 of an automobile 12. Fender skirt 10 is illustrated as being of the trunnion supported snap-on type and includes a pair of supporting or trunnion members 13 and 14 and a series of resilient fingers 15 which are adapted to engage the underturned edge 16 of the fender thereby to detachably retain fender skirt 10 in desired position on fender 11. The base edges and opening defining edge of fender 11 are provided with substantially flat rearwardly extending edge portions or flanges indicated by reference numerals 16, 17, and 18.

Ornamental fender skirts of the trunnion supported snap-on type include some form of arm or arms adapted to engage a vehicle fender at the lower corners of its wheel defining opening. The arms are adapted to be hooked into cooperating supporting elements on the vehicle fender in such a manner as to permit the fender skirt to be rocked into desired position. By providing resilient fingers on the fender skirt at points remote from the arms which are adapted to be cammed under the wheel defining edge of the fender into engagement with the rear wall thereof, an extremely simple mounting means for ornamental fender skirts is obtained.

The novel form of supporting arm or trunnion member which constitutes one of the cardinal features of this invention is shown in detail in Figure 3 of the drawings. As will be understood best from an inspection of the drawings, end 19 of arm 14 is secured in a suitable manner, such as by welding, to the rear face of fender skirt 10. The opposite end of arm 14 is bent in a spiral-like shape which extends rearwardly and upwardly from the base edge 20 of fender skirt 10. That is to say, arm 14 is bent rearwardly as at 21, then forwardly above said rearward portion as at 22, and finally rearwardly again between said rearward portion 21 and said forward portion 22 as at 23.

By positioning fender skirt 10 so that the last bend 24 of arm 14 rests on edge portion 18 of fender 11 as is indicated by the dotted lines in Figure 3, fender skirt 10 may be rocked upwardly into desired position, the rearwardly extending portion 23 of arm 14 being designed and dimensioned to prevent substantial downward displacement of fender skirt 10 when the fender skirt is in an upright position. It will readily be apparent to those skilled in the art that this particular type of supporting arm or trunnion member provides an extraordinarily simple supporting means for an ornamental fender skirt which may quickly and simply engage a fender of the flat edge type without making any alterations to the fender or any additions thereto.

In order to retain fender skirt 10 in desired position on the vehicle fender 11, a plurality of substantially L-shaped spring fingers 15 are secured to fender skirt 10 in some suitable manner, such as by means of brackets 25. Brackets 25 may be riveted or otherwise secured to fender skirt 10 in any manner well known to those skilled in the art. As may be seen best in Figure 4 of the drawings, the outwardly extending free ends of fingers 15 are each provided with a raised or hump portion 26 which is adapted to be cammed under edge 16 of fender 11, and to thereafter hold fender skirt 10 in desired position by engagement of the forward face of hump 26 with the rear end of edge portions 16. This particular form of ornamental skirt retaining means is described and claimed in my copending application entitled "Ornamental fender skirt", filed August 29, 1936, Serial No. 98,441.

A slightly modified form of this invention is illustrated in Figures 5 and 6 of the drawings wherein the supporting arms for the ornamental fender skirt are made integral therewith, and wherein the spring fingers which are adapted to maintain the ornamental fender skirt in desired position are also made integral with the fender skirt. Supporting arms 27 in this instance are stamped from the same sheet of metal and preferably during the same stamping operation as the ornamental fender skirt 10. The arms 27 are thereafter bent into their spiral shape as is indicated in the drawings.

The skirt retaining fingers 28 are also made integral with fender skirt 10 in this modification of the invention. Preferably a portion of the upper edge is serrated and then bent backwards on itself and then rearwardly in the manner shown in Figure 6 of the drawings.

It is sometimes desirable to prevent a metal to metal contact between the ornamental fender skirt 10 and the vehicle fender 11. In Figure 6 of the drawings I have illustrated a strip of cushioning material 29 composed of suitable material such as rubber, carried on the downward and rearwardly extending edge portion 30 of fender skirt 10. Cushioning strip 29 may be secured to edge portion 30 of fender skirt 10 in any suitable manner such as by cementing (not shown) or by securing and tensioning the ends of strip 29 to edge portion 30 (not shown).

From the above description, it will be apparent that I have provided an extraordinarily simple means for supporting and securing an ornamental fender skirt to a vehicle fender. As will readily be understood, this particular type of mounting means for ornamental fender skirts is particularly suitable for use with vehicle fenders having substantially flat inturned edge portions.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender skirt having means thereon adapted to detachably secure said skirt to a vehicle fender by a snap-on engagement therewith, said means including a pair of substantially spirally bent arms secured to said skirt near the base thereof, said arms being adapted to inter-engage a rearwardly extending flange on said vehicle fender.

2. As an article of manufacture, an ornamental fender skirt having means thereon adapted to support said skirt on a vehicle fender, said means being adapted to permit angular movement of said skirt in a plane substantially perpendicular to the plane of the skirt, and means adapted to prevent angular movement of said skirt after said skirt is assembled on said fender, said first means including a pair of substantially spirally bent arms adapted to inter-engage a rearwardly extending flange on said vehicle fender.

3. As an article of manufacture, an ornamental fender skirt having means thereon adapted to support said skirt on a vehicle fender, said means being adapted to permit angular movement of said skirt in a plane substantially perpendicular to the plane of the skirt, and means on said skirt remote from said first means adapted to secure said skirt to said fender, said first means including a pair of substantially spirally bent arms adapted to inter-engage a rearwardly extending flange on said vehicle fender, the spiral being rolled rearwardly and upwardly from the base of said fender skirt.

4. As an article of manufacture, an ornamental fender skirt having means thereon adapted to support said skirt on a vehicle fender, said means being adapted to permit angular movement of said skirt in a plane substantially perpendicular to the plane of the skirt, and means on said skirt remote from said first means adapted to secure said skirt to said fender, said first means including a pair of substantially spirally bent arms adapted to inter-engage a rearwardly extending flange on said vehicle fender, the spiral being rolled rearwardly and upwardly from the base of said fender skirt, and said rearwardly extending flange on said fender being adapted to extend between adjacent rolls of said spiral.

5. As an article of manufacture, an ornamental fender skirt having spiral members the spiral portions of which are adapted to curl about and envelop the underturned marginal edge of a vehicle fender to support said skirt thereon and adapted to act as hinge members in assembling said skirt on a fender.

6. As an article of manufacture, an ornamental fender skirt having spiral members adapted to curl about and envelop the underturned marginal edge of a vehicle fender to support said skirt thereon and adapted to act as hinge members in assembling said skirt on a fender, and having at least one resilient finger remote from said members adapted to secure said skirt to said fender.

7. As an article of manufacture, an ornamental fender skirt having spiral members integral therewith the spiral portions of which are adapted to curl about and envelop the underturned marginal edge of a vehicle fender to support said skirt thereon and adapted to act as hinge members in assembling said skirt on a fender.

8. As an article of manufacture, an ornamental fender skirt having at least one spiral member integral therewith the spiral portion of which is adapted to inter-engage an underturned marginal edge of a vehicle fender to support said skirt in rocking engagement thereon, and having a plurality of integral fingers remote from said member for restricting rocking movement of said skirt away from said fender.

GEORGE ALBERT LYON.